US00RE44583E

(19) United States
(12) Reissued Patent
Chien et al.

(10) Patent Number: US RE44,583 E
(45) Date of Reissued Patent: Nov. 5, 2013

(54) METHOD FOR AUTOMATICALLY FORWARDING AND REPLYING SHORT MESSAGE

(75) Inventors: Andrew Chien, Taoyuan Hsien (TW); Cadmus Chen, Taoyuan Hsien (TW); Xavier Sun, Taoyuan Hsien (TW); John Chang, Taoyuan Hsien (TW); Edward Kuo, Taoyuan Hsien (TW)

(73) Assignee: Guan Technologies, LLC, Wilmington, DE (US)

(21) Appl. No.: 11/947,681

(22) Filed: Nov. 29, 2007

Related U.S. Patent Documents

Reissue of:
(64) Patent No.: 6,971,064
Issued: Nov. 29, 2005
Appl. No.: 09/987,218
Filed: Nov. 14, 2001

(51) Int. Cl.
*G06F 3/00* (2006.01)

(52) U.S. Cl.
USPC ..... 715/758; 715/751; 715/864; 709/205; 709/230

(58) Field of Classification Search
USPC ..... 715/758, 751, 864; 709/205, 230
See application file for complete search history.

(56) References Cited

U.S. PATENT DOCUMENTS

| | | | | |
|---|---|---|---|---|
| 5,555,346 | A * | 9/1996 | Gross et al. | 706/45 |
| 6,226,686 | B1 | 5/2001 | Rothschild et al. | |
| 6,519,771 | B1 | 2/2003 | Zenith | |
| 6,718,368 | B1 | 4/2004 | Ayyadurai | |
| 6,727,916 | B1 | 4/2004 | Ballard | |
| 6,826,596 | B1 | 11/2004 | Suzuki | |
| 6,971,064 | B2 | 11/2005 | Chien et al. | |
| 7,024,462 | B1 * | 4/2006 | McErlean | 709/207 |
| 7,328,031 | B2 | 2/2008 | Kraft | |
| 2005/0049880 | A1 * | 3/2005 | Roth et al. | 704/277 |
| 2009/0164595 | A1 * | 6/2009 | Shiigi | 709/206 |

FOREIGN PATENT DOCUMENTS

| | | | |
|---|---|---|---|
| JP | 2000207304 | A | 7/2000 |
| JP | 2001101097 | A | 4/2001 |
| JP | 2001223818 | A | 8/2001 |

OTHER PUBLICATIONS

ETSI TC-SMG, Digital Cellular Telecommunication System; Technical relization of the short message Service, Jul. 1996, version 5.3.0.*

Shiigi Clyde, DataHouse StarMail technology; Oct. 1999; 69 pages.*

* cited by examiner

*Primary Examiner* — Doon Chow
*Assistant Examiner* — Linh K Pham
(74) *Attorney, Agent, or Firm* — Perkins Coie LLP

(57) ABSTRACT

A method for automatically forwarding and replying short message is provided. Firstly, a local user joins a message chat room. If the user presses a key for forwarding a message, the message chat room provides structuralized, modularized and hierarchy message menu to the user, else the local user waits for a plurality of pre-established reply messages provided by a server or a remote cellulous phone. At this time, the local user can press a modify key to modify the reply messages and the message chat room provides an editing window to facilitate modify operation. Afterward, the local user presses a send key after selecting a replay message.

13 Claims, 5 Drawing Sheets

METHOD FOR AUTOMATICALLY FORWARDING AND REPLYING SHORT MESSAGE

Matter enclosed in heavy brackets [ ] appears in the original patent but forms no part of this reissue specification; matter printed in italics indicates the additions made by reissue.

*CROSS-REFERENCE TO RELATED APPLICATION*

*This patent application is a reissue application for U.S. Pat. No. 6,971,064, issued from U.S. patent application Ser. No. 09/987,218, filed on Nov. 14, 2001.*

FIELD OF THE INVENTION

The present invention relates to a method for automatically forwarding and replying short message, especially to a method for automatically forwarding and replying short message, wherein a plurality of feasible short messages are stored in a mobile station or a server end to facilitate message forwarding and replying task for user.

BACKGROUND OF THE INVENTION

There are about five hundred million messages sent around the world per month by estimation. Just as e-mail to computer, short messages are also popular to user of cellulous phone. More particularly, the WAP (wireless application protocol) combining the service of mobile network and Internet skill also provides value-added data service for cellulous phone. Therefore, cellulous phone user can send textual message or graphic message to his friend when verbal conversation is not convenient for him.

However, text input is tedious work for cellulous phone user because extremely limited keys are provided on the keypad of the cellulous phone.

SUMMARY OF THE INVENTION

It is an object of the present invention to provide a method for automatically forwarding and replying short message, wherein the local user can select message from one of a plurality of pre-established reply messages and modify the selected message and then send the message. Moreover, structuralized, modularized and hierarchy menu is provided to the local user.

It is another object of the present invention to provide a method for automatically forwarding and replying short message, wherein a server or a remote user can find corresponding pre-established reply messages according to the packet sent from the local user and provide the corresponding reply messages to the local user.

To achieve the above objects, the present invention provides a method for automatically forwarding and replying short message. Firstly, a local user joins a message chat room. If the user presses a key for forwarding a message, the message chat room provides structuralized, modularized and hierarchy message menu to the user, else the local user waits for a plurality of pre-established reply messages provided by a server or a remote cellulous phone. Afterward, the local user presses a send key after selecting a replay message.

The various objects and advantages of the present invention will be more readily understood from the following detailed description when read in conjunction with the appended drawing, in which:

DETAILED DESCRIPTION OF THE INVENTION

Figure 1:
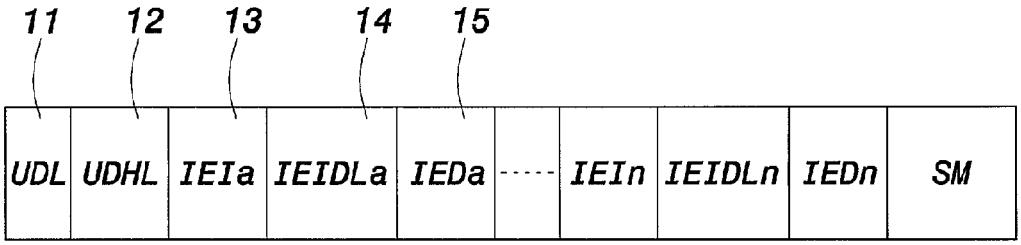
FIG. 1 PRIOR ART
FIG. 1 shows the packet format in prior art message.

FIG. 1 shows the format of a message packet of cellulous phone. The message packet of cellulous phone comprises a user define length (UDL) 11, a user define head length (UDHL) 12, a plurality of information element identifier (IEI) 13, a plurality of information element identifier data length (IEIDL) 14, and a plurality of information element data (IED) 15. Moreover, the IEI 13 has reserved code values 0-BF, and E0-FF.

Figure 2:
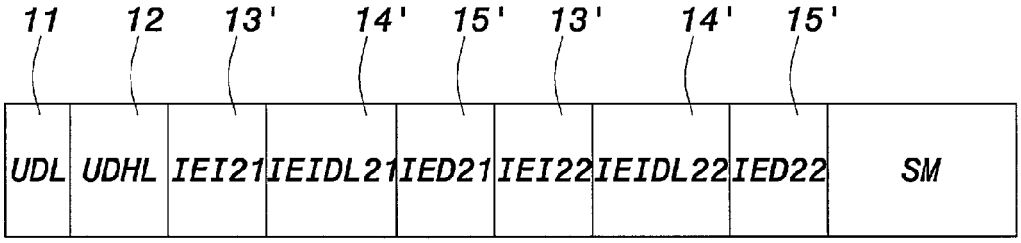
FIG. 2 shows the packet format in the message of the present invention.

In the present invention, the reserved code value 21 of the IEI 13 is defined as the forward message in message chat room and the reserved code value 22 of the IEI 13 is defined as the reply message for message chat room. FIG. 2 shows the packet format of the forward message and the reply message of the present invention. The value stored in the IEIDL21 (14') indicates the data length in IED21 (15'). In the IED21 (15') data, the first four bit of the first byte are defined as code of the first layer menu in the forward message, and the last four bit of the first byte are defined as code of the second layer menu in the forward message. Moreover, in IED21 (15') data, the second byte to the n-th byte are used to store string, graph, ring tone and motion picture data defined by IEI21 (13'). The value stored in the IEIDL22 (14") indicates the data length in IED22 (15"). Moreover, in IED22 (15") data, the first byte to the n-th byte are used to store reply message and include string, graph, ring tone and motion picture data defined by IEI22 (13").

Figure 3:
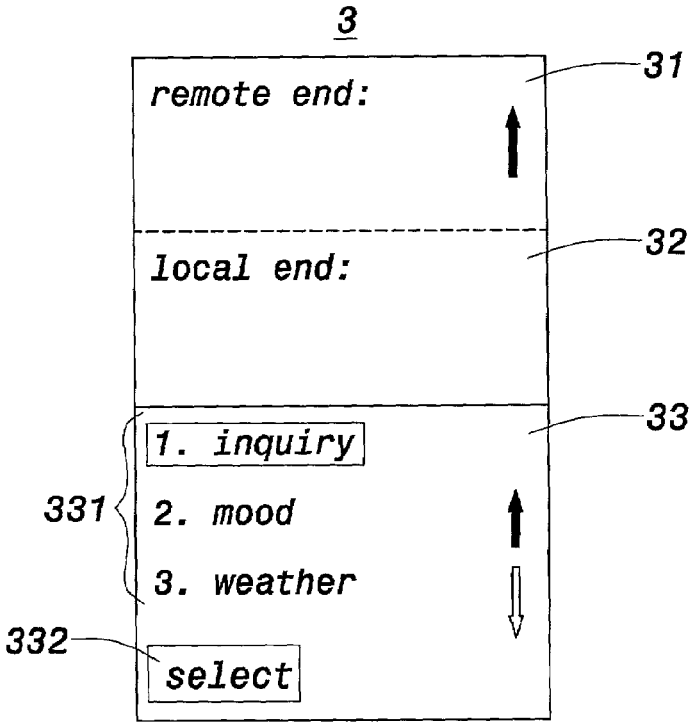
FIGS. 3 to 7 show the operation windows in the message chat room of the present invention.
Figure 4:
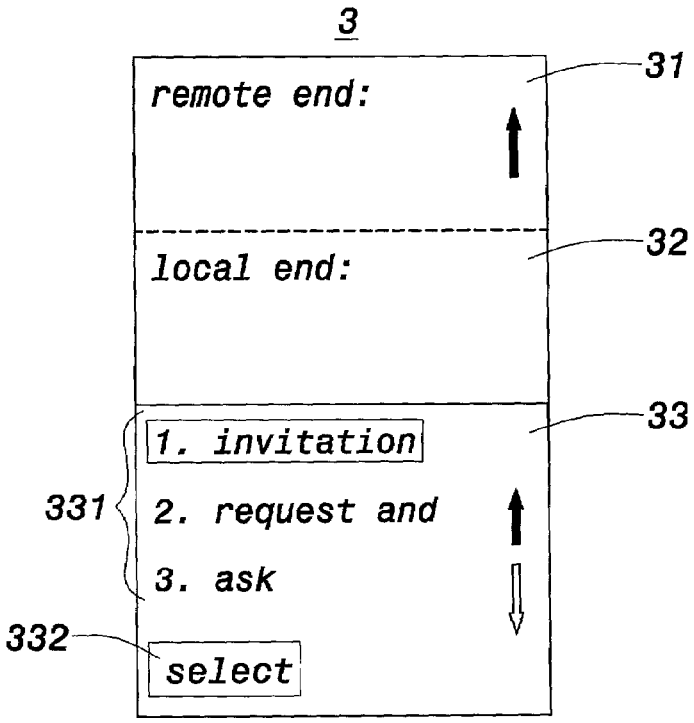

FIGS. 3 and 4 show the operation screen of a message chat room 3, as shown in those figures, structuralized, modularized and hierarchy menu is provided in the present invention, The operation screen comprises a top window 31 for displaying message sent by a remote user, a middle window 32 for displaying message sent by a local user and a bottom window 33 listing a main menu 331. The main menu 331 comprises following entries: 1. inquiry, 2. mood, 3. weather, 4. invitation, 5. request and 6. ask. Those entries are stored in the first layer menu of the IED21 (15'). The local user can use arrow keys to highlight a certain entry in the main menu 331 and then press a selection key 332 on bottom of the bottom window 33 to select this entry.

Figure 5:
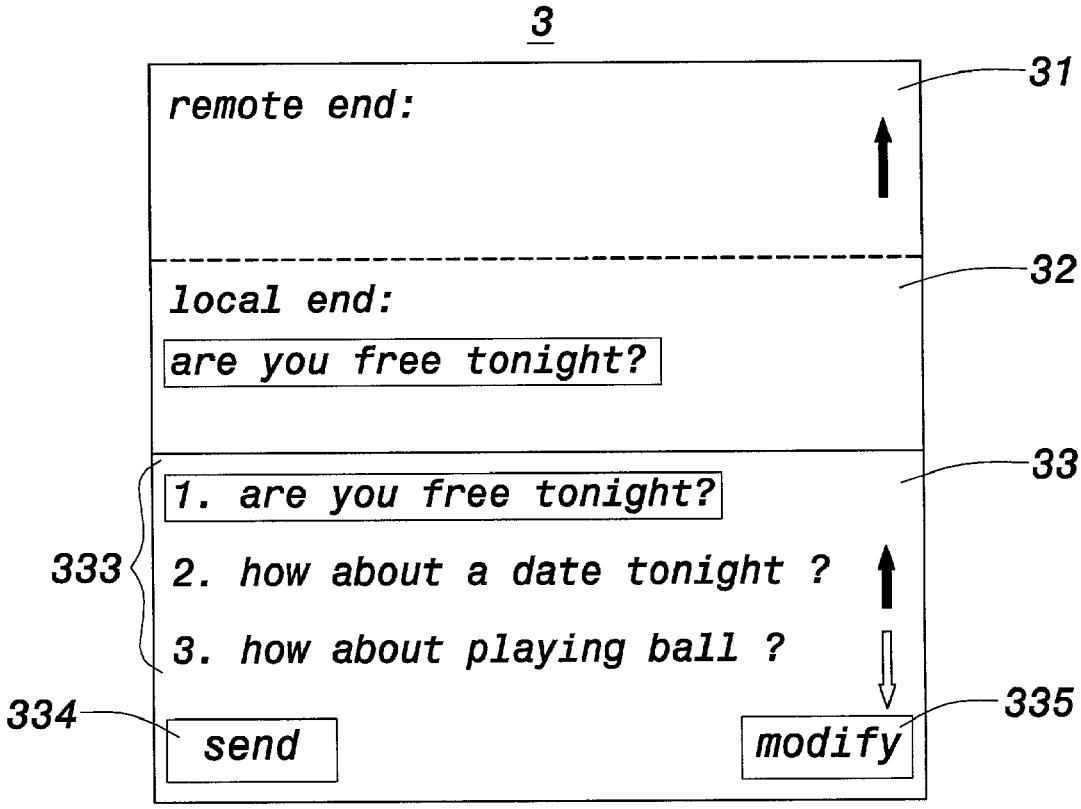
Figure 6:
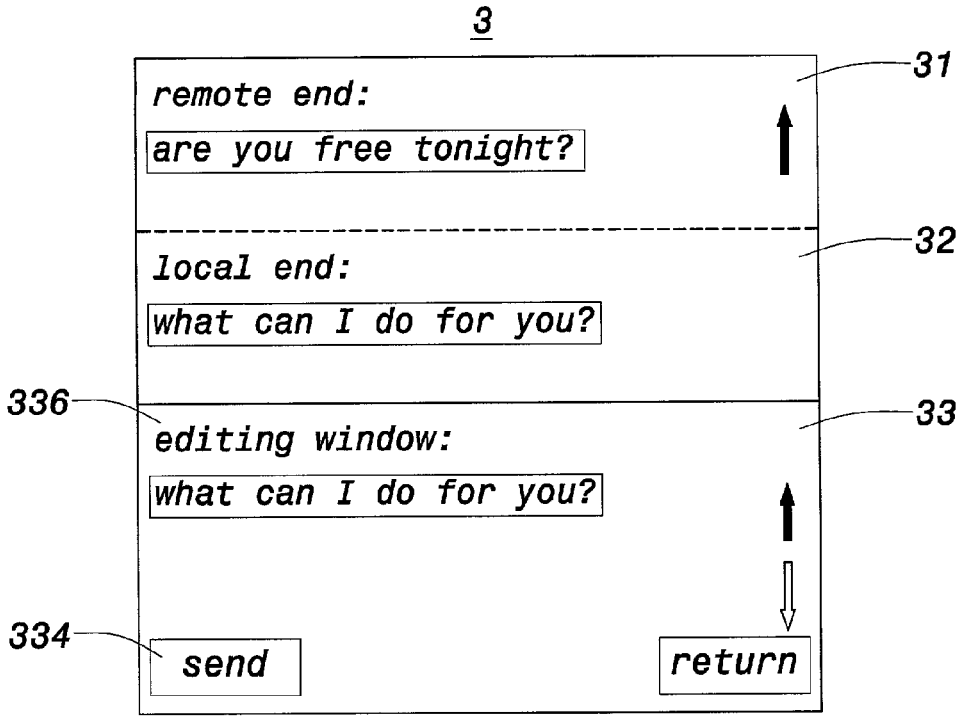

With reference now to FIG. 5, provided that the user select the entry 1: inquiry in the main menu 331, the screen in the bottom window 33 is changed to display a sub menu 333 corresponding to the inquiry entry and comprising following sub entries: 1. are you free tonight? 2. how about a date tonight? 3. how about playing ball?. Those entries are stored in the second layer menu of the IED21 (15'). The local user can use arrow keys to highlight a certain entry in the sub menu 333 and then press a send key 334 on bottom of the bottom window 33 to send message in this entry, or press a modify key 335 on bottom of the bottom window 33 to modify message in this entry. When the user presses the modify key 335 to modify message in this entry, an editing window 336 appears in the bottom window 33 to facilitate the user to modify message, as shown in FIG. 6.

Figure 7:
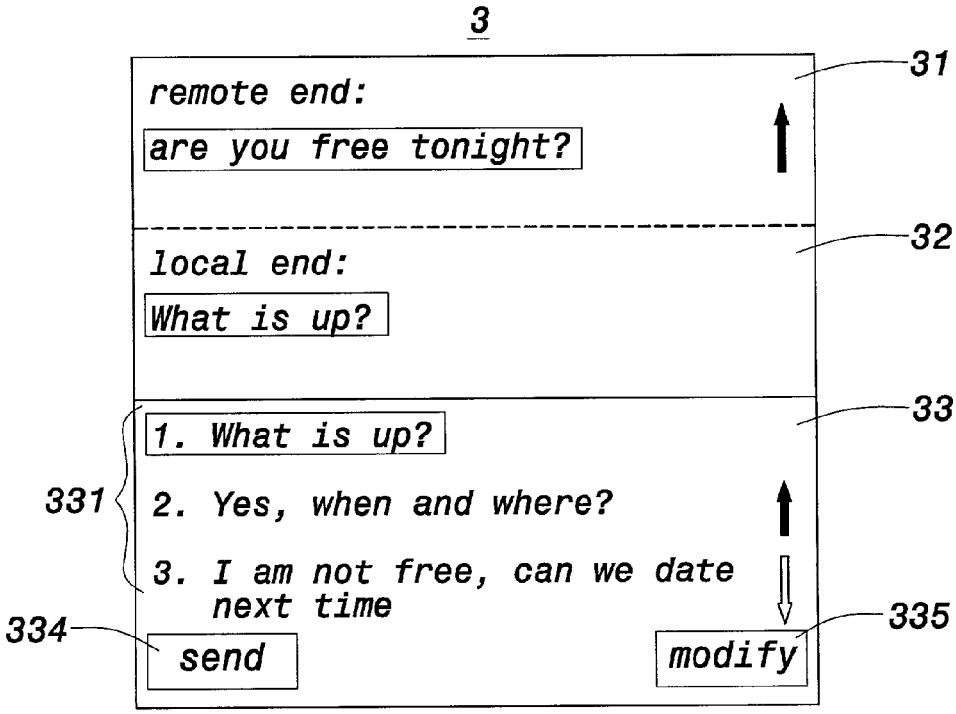

After the local user presses the send key 334 on the bottom window 33, the message initially stored in the sub menu 333 or modified by the local user is present in the middle window 32 of the chat room 3. Moreover, the displayed message is also written to related field of the IEI 21 (13'). The displayed message may be or may not be written to the related field of the IEI 22 (13"), depending on following situations:

1. If the replying mechanism is provided by remote cellulous phone, the related field of the IEI 22 (13") is not present in the message packer 1. The remote cellulous phone has an internal database storing a plurality of reply messages and the reply messages are displayed on the bottom window 33, which can be chosen by the remote user, as shown in FIG. 7.

2. If the replying mechanism is provided by a server, i.e. the service provider has this function, the reply messages are written to the related field of the IEI 22 (13"). The remote cellulous phone receives this message and the reply messages are displayed on the bottom window 33, which can be chosen by the remote user, as shown in FIG. 7.

Figure 8:
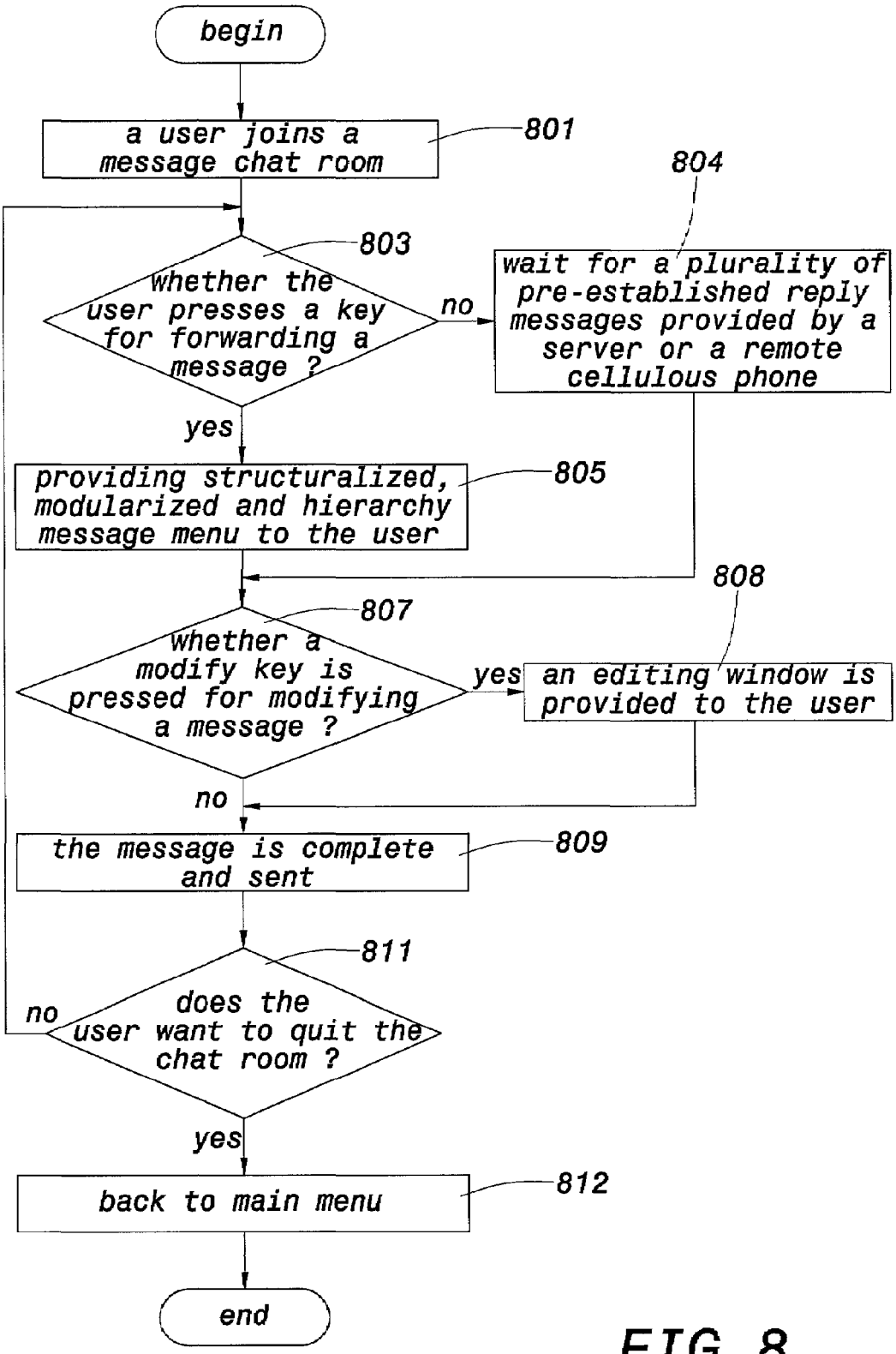
FIG. 8 shows the operation flowchart of the present invention.

FIG. 8 shows the operation flowchart of the present invention.

Step 801: a user joins a message chat room 3;

Step 803: whether the user presses a key for forwarding a message? If true the process moves to step 805 else the process moves to step 804 to wait for a plurality of pre-established reply messages provided by a server or a remote cellulous phone and then a step 807 is executed;

Step 805: providing structuralized, modularized and hierarchy message menu to the user;

Step 807: whether a modify key 335 is pressed for modifying a message? If true, an editing window 336 is provided to the user to modify the message in step 808 and then a step 809 is executed, else the step 809 is directly executed;

Step 809: the message is complete and a send key 334 is pressed to send this message;

Step 811: does the user want to quit the chat room 3? If true, a step 812 is executed to back the main menu of the cellulous phone and the whole process is over, else the process moves back to step 803.

To sum up, the method for automatically forwarding and replying short message has following advantages:

1. Providing structuralized, modularized and hierarchy message menu to the user.

2. The effort of complicated and annoy text input can be reduced.

3. The provided message can be modified.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

We claim:

1. A method for automatically forwarding and replying to short messages comprising the following steps:

a local user joining a message chat room;

examining whether the user presses a key for forwarding a message;

if the user has pressed said key for forwarding said message, providing a structuralized, modularized and [hierarchy] *hierarchical* message menu to the user, else the local user waiting for a plurality of [pie-established reply] *pre-established* messages provided by a server or a remote cellular phone and the local user pressing a send key after selecting a reply message;

the message having a packet format comprising a user defined length (UDL), a user defined head length (UDHL), a plurality of information element identifiers (IEI), a plurality of information element identifier data lengths (IEIDL), and a plurality of information element data (IED), the *individual* information element [data] *identifiers* containing an [IED21] *IEI21* indicating a forward message in the message chat room and an [IED22] *IEI22* indicating a reply message in the message chat room, wherein, a corresponding field of the IEI22 is not present in the message packet when the reply message is provided by the remote cellular phone, *and wherein* the reply message is written to the corresponding field of the IEI22 when the reply message is provided by the server.

2. The method for automatically forwarding and replying short message as in claim 1, wherein in the IED21 data, the first four [bit] *bits* of the first byte are defined as code of a first layer menu in the forward message, and the last four [bit] *bits* of the first byte are defined as code of a second layer menu in the forward message; the second byte to the n-th byte are used to store string, graph, ring tone and motion picture data defined by IEI21.

3. The method for automatically forwarding and replying short message as in claim 1, wherein in the IED22 data, the first byte to the n-th byte are used to store string, graph, ring tone and motion picture data defined by IEI22.

*4. One or more computer memories storing a message packet format data structure comprising, for each of a plurality of messages, a user defined length (UDL), a user defined head length (UDHL), a plurality of information element identifiers (IEI), a plurality of information element identifier data lengths (IEIDL), and a plurality of information element data (IED), wherein each IEI contains an IEI21 indicating a forward message in a message chat room and an IEI22 indicating a reply message in the message chat room, and wherein, for the individual messages*

*if a reply message is provided by a remote cellular phone, a corresponding field of the IEI22 is not present in the message packet; and*

*if the reply message is provided by a server, the reply message is written to the corresponding field of the IEI22.*

*5. A system, comprising:*

*a server configured to communicate one or more messages to a chat room via a remote cellular phone;*

*wherein the one or more messages are sent in one or more packets, the individual packets having a packet format comprising a user defined length (UDL), a user defined head length (UDHL), a plurality of information element identifiers (IEI), a plurality of information element identifier data lengths (IEIDL), and a plurality of information element data (IED), and wherein each IEI comprises (a) an IEI21 indicating a forward message in the chat room, and (b) an IEI22 indicating a reply message in the chat room; and*

*wherein when the reply message is sent by the cellular phone a corresponding field of the IEI22 is not present in the one or more packets, and when the reply message is sent by the sever the reply message is written to the corresponding field of the IEI22.*

*6. The system of claim 5 wherein:*

*the IEI21 comprises n bytes, wherein individual bytes have multiple bits;*

*the first four bits of the first byte in the IEI21 are defined as code of a first layer menu in the forward message; and*

*the last four bits of the first byte in the IEI21 are defined as code of a second layer menu in the forward message.*

*7. The system of claim 6 wherein:*

*the second byte to the n-th byte in the IEI21 are used to store string, graph, ring tone, and motion picture data defined by the IEI21.*

*8. The system of claim 5, further comprising:*

*an operation screen configured to display a message sent by a remote user, a message sent by a local user, and a main menu configured to display a plurality of entries;*

*one or more arrow keys configured to highlight one of the plurality of entries displayed on the main menu; and*

*a selection key configured to select one of the plurality of entries displayed on the main menu.*

*9. The system of claim 8 further comprising a modify key configured to display an editing window on the operation screen when the local user chooses to edit one of the plurality of entries.*

*10. A system, comprising:*

*a message exchange area; and*

*a plurality of pre-established reply messages displayed in the message exchange area;*

*wherein the plurality of pre-established messages are provided to at least one of a cellular phone or a server; and*

*wherein the plurality of pre-established messages are sent in one or more packets, the one or more packets each comprising a packet forming having a user defined length (UDL), a user defined head length (UDHL), a plurality of information element identifiers (IEI), a plurality of information element identifier data lengths (IE-IDL), and a plurality of information element data (IED), each IEI containing and IEI21 indicating a forward message in the message exchange area and an IEI22 indicating a reply message in the message exchange area; and*

*if the reply message is provided by the cellular phone, a corresponding field of the IEE22 is not present in the one or more packets; and*

*if the reply message is provided by the server, the reply message is written to the corresponding field of the IEI22.*

*11. The system of claim 10 wherein the message exchange area comprises:*

*an operation screen configured to display a message sent by a remote user, a message sent by a local user, and a main menu configured to display a plurality of entries;*

*one or more arrow keys configured to highlight one of the plurality of entries displayed on the main menu;*

*a selection key configured to select one of the plurality of entries displayed on the main menu; and*

*a modify key configured to display an editing window on the operation screen when the local user chooses to edit one of the plurality of entries.*

*12. A system, comprising:*

*a remote device including at least one of a cellular phone or a server; and*

*a message display facility configured to display one or more pre-established messages provided by the remote device;*

*wherein the plurality of pre-established messages are sent in one or more packets, the one or more packets each comprising a packet format including a user defined length (UDL), a user defined head length (UDHL), a plurality of information element identifiers (IEI), a plurality of information element identifier data lengths (IE-IDL), and a plurality of information element data (IED), each IEI containing an IEI21 indicating a forward message in a chat room and an IEI22 indicating a reply message in the chat room; and*

*if the reply message is provided by the cellular phone, a corresponding field of the IEI22 is not present in the one or more packets; and*

*if the reply message is provided by the server, the reply message is written to the corresponding field of the IEI22.*

*13. A system, comprising:*

*means for displaying one or more messages; and*

*means for communicating the one or more messages to the means for displaying the one or more messages via a remote cellular phone;*

*wherein the one or more messages are sent via one or more message packets, the one or more message packets each comprising a package format having a user defined length (UDL), a user defined head length (UDHL), a plurality of information element identifiers (IEI), a plurality of information element identifier data lengths (IE-IDL), and a plurality of information element data (IED), each information element identifiers containing an IEI21 indicating a forward message in the means for displaying the one or more messages, and an IEI22 indicating a reply message in the means for displaying the one or more messages;*

*wherein when the reply message is sent by the cellular phone a corresponding field of the IEI22 is not present in the one or more message packets, and when the reply message is sent by the means for communicating the reply message is written to the corresponding field of the IEI22.*

* * * * *